US012347387B2

(12) United States Patent
Kim et al.

(10) Patent No.: US 12,347,387 B2
(45) Date of Patent: Jul. 1, 2025

(54) DISPLAY APPARATUS AND DRIVING METHOD THEREOF

(71) Applicant: LG Display Co., Ltd., Seoul (KR)

(72) Inventors: Min Hoi Kim, Seoul (KR); Tae Gung Kim, Seoul (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/513,998

(22) Filed: Nov. 20, 2023

(65) Prior Publication Data

US 2024/0221681 A1 Jul. 4, 2024

(30) Foreign Application Priority Data

Dec. 29, 2022 (KR) ........................ 10-2022-0188920

(51) Int. Cl.
*G09G 3/3266* (2016.01)

(52) U.S. Cl.
CPC ... *G09G 3/3266* (2013.01); *G09G 2300/0842* (2013.01); *G09G 2310/08* (2013.01); *G09G 2320/0233* (2013.01); *G09G 2340/0421* (2013.01); *G09G 2360/16* (2013.01)

(58) Field of Classification Search
CPC ... G06T 5/73; G06T 2207/20201; G06T 5/70; G09G 3/3266; G09G 2300/0408; G09G 2300/0814; G09G 2310/02; G09G 2310/0202; G09G 2310/0229; G09G 2310/0224; G09G 2310/0227; G09G 2310/0267; G09G 3/3674; G09G 2310/04; G09G 2320/0233; G09G 2320/0276; G09G 2320/0271; G09G 2320/0626; G09G 2340/0407; G09G 2340/0428; G09G 2360/16; G09G 2340/0421; G09G 2340/0414; G09G 5/391
See application file for complete search history.

(56) References Cited

U.S. PATENT DOCUMENTS

2021/0027751 A1* 1/2021 Tang .................... G09G 3/3607
2023/0335064 A1* 10/2023 Her ....................... G09G 3/3266
2024/0274075 A1* 8/2024 Choi .................... G09G 3/3233

FOREIGN PATENT DOCUMENTS

KR 20220005700 A * 1/2022

OTHER PUBLICATIONS

KR 20220005700 (Year: 2022).*

* cited by examiner

*Primary Examiner* — Sanjiv D. Patel
(74) *Attorney, Agent, or Firm* — Fish & Richardson P.C.

(57) ABSTRACT

A display apparatus includes a display panel configured to display an image, a gate driver configured to supply gate signals to the display panel, a timing controller configured to control the gate driver; and a memory controlled by the timing controller, wherein the timing controller performs masking so that the gate signals are not output when a resolution of the image to be input is changed to a second resolution which is lower than a first resolution, and calculates a driving compensation value to display the image with the second resolution during a resolution change period.

17 Claims, 15 Drawing Sheets

[i.g: $V_{TH\_\#A} < V_{TH\_\#B}$]

DISPLAY APPARATUS AND DRIVING METHOD THEREOF

CROSS-REFERENCE TO RELATED APPLICATION

This application claims the priority of Korean Patent Application No. 10-2022-0188920 filed on Dec. 29, 2022, which is hereby incorporated by reference in its entirety.

BACKGROUND

Field of the Disclosure

The present disclosure relates to a display apparatus and a driving method thereof.

Description of the Background

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

The present disclosure is to provide a display panel driven on the basis of an optimized compensation value without an increase in bandwidth caused by an additional access of a memory in changing a resolution, thereby minimizing a degradation in image quality.

Also, the present disclosure is to provide a display panel that can be simultaneously drive at least two gate lines in changing a resolution and may maintain uniform display quality by using a multiline simultaneous compensation method capable of compensating for a data signal in common, based on an optimal common compensation value to which a luminance average is applied.

To achieve these and other advantages and in accordance with the present disclosure, as embodied and broadly described herein, a display apparatus includes a display panel configured to display an image, a gate driver configured to supply gate signals to the display panel, a timing controller configured to control the gate driver, and a memory controlled by the timing controller, wherein, when a resolution of an input image is changed to a second resolution which is lower than a first resolution, the timing controller performs masking so that the gate signals are not output, and the timing controller has a resolution change period for calculating a driving compensation value needed in displaying an image with the second resolution.

The timing controller may read a first resolution driving compensation value, needed in displaying an image with the first resolution, from a first bank of the memory during the resolution change period and may calculate a second resolution driving compensation value needed in displaying an image with the second resolution, based on the first resolution driving compensation value.

The timing controller may store the second resolution driving compensation value, calculated during the resolution change period, in a second bank of the memory.

The second resolution driving compensation value may include a common compensation value for compensating for subpixels connected with at least two gate lines in common.

The common compensation value may be calculated based on a luminance average of the subpixels connected with the at least two gate lines.

The common compensation value may include a value for compensating for a threshold voltage of a driving transistor, included in each of a first subpixel connected with a first gate line and a second subpixel connected with a second gate line disposed next to the first gate line, in common.

When generating of a bitmap for compensating for an image based on the second resolution driving compensation value is completed, the display apparatus may deviate from the resolution change period, based on occurrence of a vertical blank included in a vertical synchronization signal.

In another aspect of the present disclosure, a driving method of a display apparatus includes, when a resolution of an input image is changed to a second resolution which is lower than a first resolution, performing masking not to output gate signals, reading a first resolution driving compensation value, needed in displaying an image with the first resolution, from a first bank of a memory during the resolution change period and calculating a second resolution driving compensation value, needed in displaying an image with the second resolution, based on the first resolution driving compensation value, for calculating a driving compensation value needed in displaying an image with the second resolution, and releasing the masking and applying the second resolution driving compensation value to the image having the second resolution to display an image.

The second resolution driving compensation value may include a common compensation value for compensating for subpixels connected with at least two gate lines in common.

The common compensation value may include a value for compensating for a threshold voltage of a driving transistor, included in each of a first subpixel connected with a first gate line and a second subpixel connected with a second gate line disposed next to the first gate line, in common.

The common compensation value is calculated based on a luminance average of the subpixels connected with the at least two gate lines.

The common compensation value includes a value for compensating for a threshold voltage of a driving transistor, included in each of a first subpixel connected with a first gate line and a second subpixel connected with a second gate line disposed next to the first gate line, in common.

In a further aspect of the present display, a display apparatus includes a display panel configured to display an image with one of a first resolution and a second resolution lower than the first resolution, a gate driver configured to supply a plurality of gate signals to the display panel, a memory including a first bank and second bank, the first bank storing a first resolution driving compensation value for compensating for the image to be displayed with the first resolution; and a timing controller configured to control the gate driver to output the plurality of gate signals to display the image with the first resolution and not to output the plurality of gate signals to display the image with the second resolution, and calculate a second resolution driving compensation value for compensating for the image to be displayed with the second resolution based on the first resolution driving compensation value during a resolution change period.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light on the basis of an inorganic light emitting diode or an organic light emitting diode will be described for example.

Moreover, in the following description, a thin film transistor (TFT) may be implemented as a p-type TFT or with an n-type TFT and a p-type TFT. The TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the p-type TFT, because a carrier is a hole, a source voltage may be higher than a drain voltage so that the hole flows from the source to the drain. In the p-type TFT, because the hole flows from the source to the drain, a current may flow from the source to the drain. On the other hand, in the n-type TFT, because a carrier is an electron, a source voltage may be lower than a drain voltage so that the electron flows from the source to the drain. In the n-type TFT, because the electron flows from the drain to the source, a current may flow from the drain to the source. However, a source and a drain of a TFT may switch therebetween based on a voltage applied thereto. Based thereon, in the following description, one of a source and a drain will be described as a first electrode, and the other of the source and the drain will be described as a second electrode.

Figure 1:
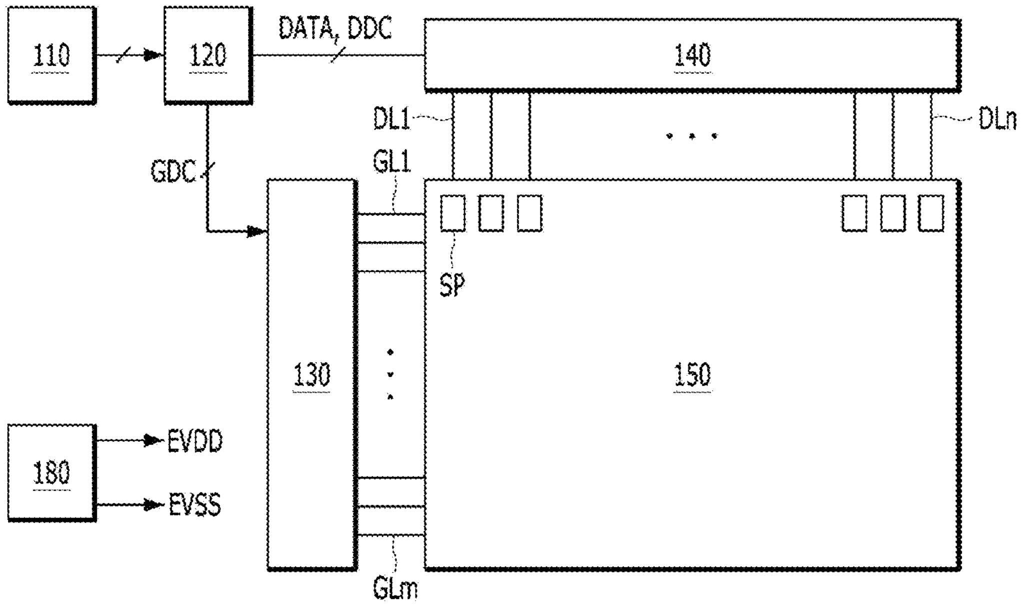
FIG. 1 is a block diagram schematically illustrating a display apparatus according to an aspect of the present disclosure.
Figure 2:
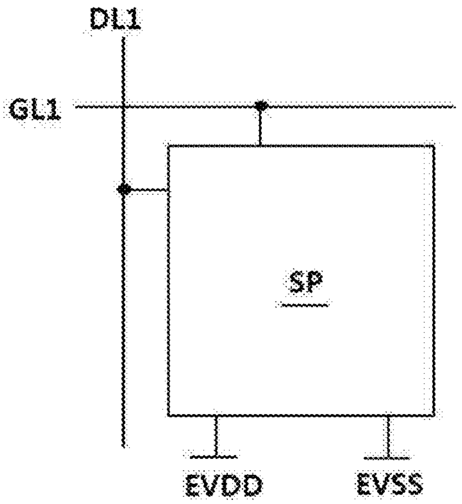
FIG. 2 is a block diagram schematically illustrating a subpixel illustrated in FIG. 1.

FIG. 1 is a block diagram schematically illustrating a display apparatus according to an aspect of the present disclosure, and FIG. 2 is a block diagram schematically illustrating a subpixel illustrated in FIG. 1.

As illustrated in FIGS. 1 and 2, a light emitting display apparatus according to an aspect of the present disclosure may include a video supply unit 110, a timing controller 120, a gate driver 130, a data driver 140, a display panel 150, and a power supply 180.

The video supply unit 110 (a set or a host system) may output a video data signal supplied from the outside or a video data signal (an image data signal) stored in an internal memory thereof. The video supply unit 110 may supply a data signal and the various driving signals to the timing controller 120.

The timing controller 120 may output a gate timing control signal GDC for controlling an operation timing of the gate driver 130, a data timing control signal DDC for controlling an operation timing of the data driver 140, and various synchronization signals. The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The gate driver 130 may output a gate signal (or a gate voltage) in response to the gate timing control signal GDC supplied from the timing controller 120. The gate driver 130 may supply the gate signal to a plurality of subpixels, included in the display panel 150, through a plurality of gate lines GL1 to GLm. The gate driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a high level voltage and a low level voltage on the basis of an external input voltage supplied from the outside and may output the high level voltage and the low level voltage through a first power line EVDD and a second power line EVSS. The power supply unit 180 may generate and output a voltage (for example, a gate high voltage and a gate low voltage) needed for driving of the gate driver 130 or a voltage (a drain voltage including a half drain voltage and a drain voltage) needed for driving of the data driver 140, in addition to the high level voltage and the low level voltage.

The display panel 150 may display an image on the basis of a driving signal including the gate signal and a data voltage and a driving voltage including the high level voltage and the low level voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the first power line EVDD, and the second power line EVSS and may include a pixel circuit which includes a switching transistor, a driving transistor, a storage capacitor, and an organic light emitting diode. The subpixel SP applied to the light emitting display apparatus may self-emit light, and thus, may be complicated in circuit configuration. Also, the subpixel SP may further include various circuits such as a compensation circuit which compensates for a degradation in the organic light emitting diode emitting light and a degradation in the driving transistor supplying a driving current to the organic light emitting diode. Accordingly, it may be assumed that the subpixel SP is simply illustrated in a block form.

Hereinabove, each of the timing controller 120, the gate driver 130, and the data driver 140 has been described as an individual element. However, based on an implementation type of the light emitting display apparatus, one or more of the timing controller 120, the gate driver 130, and the data driver 140 may be integrated into one IC.

Figure 3:
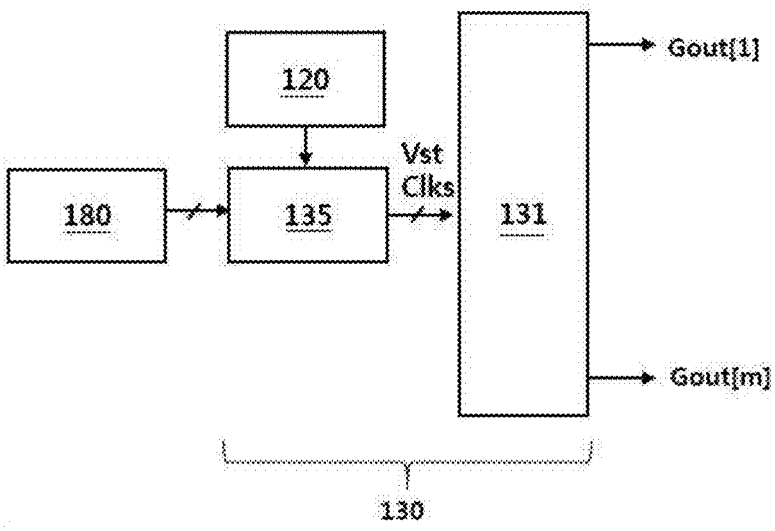
FIGS. 3 and 4 are diagrams for describing a configuration of a gate driver of a gate in panel (GIP) type.
Figure 4:
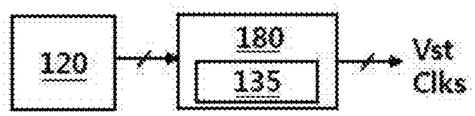
Figure 5:
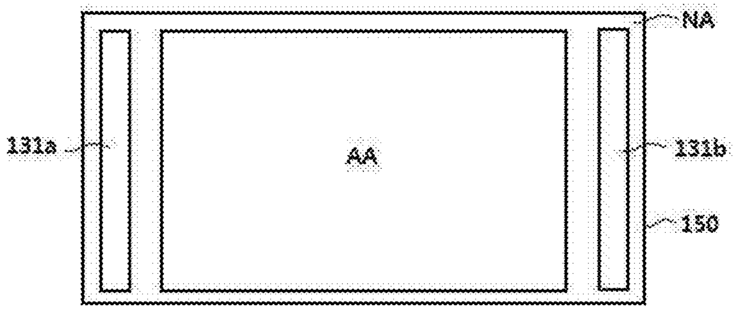
FIG. 5 is a diagram illustrating an arrangement example of the gate driver of the GIP type.

FIGS. 3 and 4 are diagrams for describing a configuration of a GIP-type gate driver 130, and FIG. 5 is a diagram illustrating an arrangement example of the GIP-type gate driver 130.

As illustrated in FIG. 3, the GIP-type gate driver 130 may include a shift register 131 and a level shifter 135. The level shifter 135 may generate clock signals Clks and a start signal Vst, based on signals and voltages output from the timing controller 120 and the power supply 180. The shift register 131 may operate based on the clock signals Clks and the start signal Vst output from the level shifter 135 and may output gate signals Gout[1] to Gout[m].

As illustrated in FIGS. 3 and 4, the level shifter 135 may be independently provided as an IC type unlike the shift register 131, or may be included in the power supply 180. However, this may be merely an aspect, and aspects of the present disclosure are not limited thereto.

As illustrated in FIG. 5, first and second shift registers 131*a* and 131*b* which output gate signals in the GIP-type gate driver may be disposed in a non-display area NA of the display panel 150. The first and second shift registers 131*a* and 131*b* may be implemented as a thin film type in the display panel 150, based on the GIP type. An example is illustrated where the first and second shift registers 131*a* and 131*b* are respectively disposed in a left non-display area NA and a right non-display area NA of the display panel 150, but aspects of the present disclosure are not limited thereto.

Figure 9:
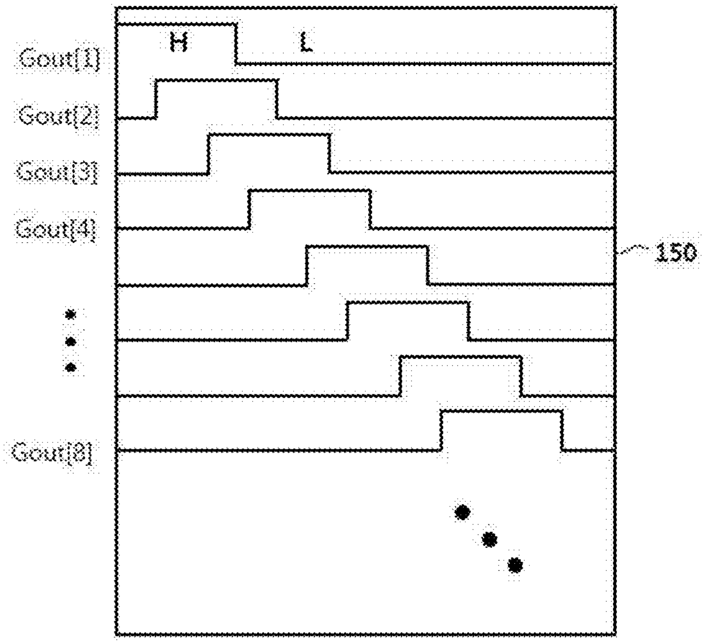
Figure 10:
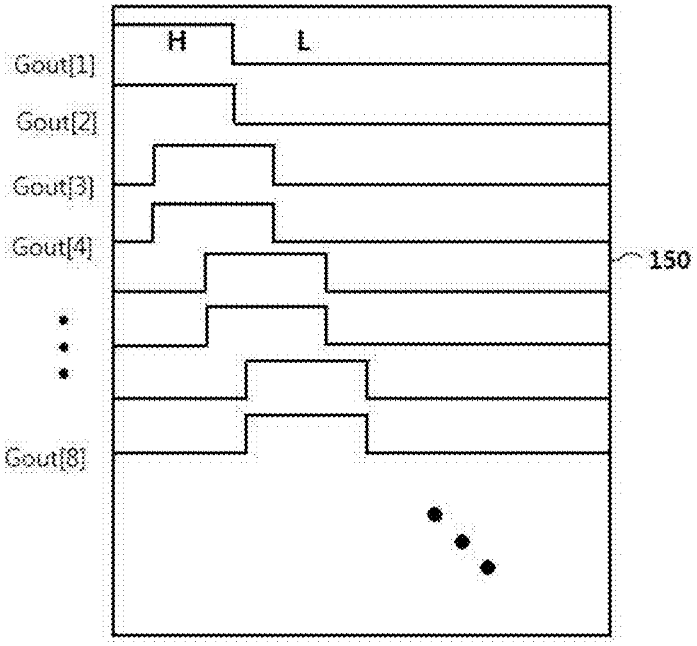
Figure 11:
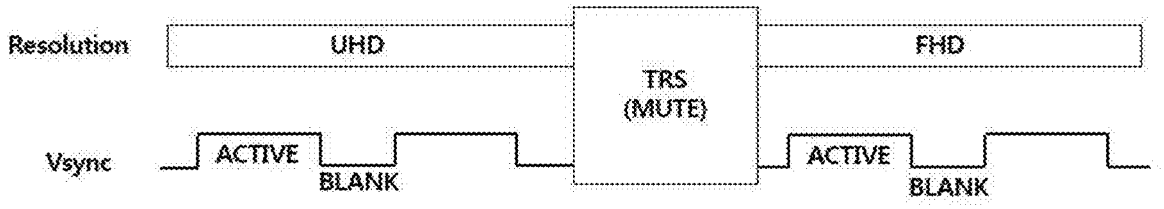
FIGS. 11 and 12 are diagrams for describing a portion associated with a resolution change period occurring in changing a mode.
Figure 12:
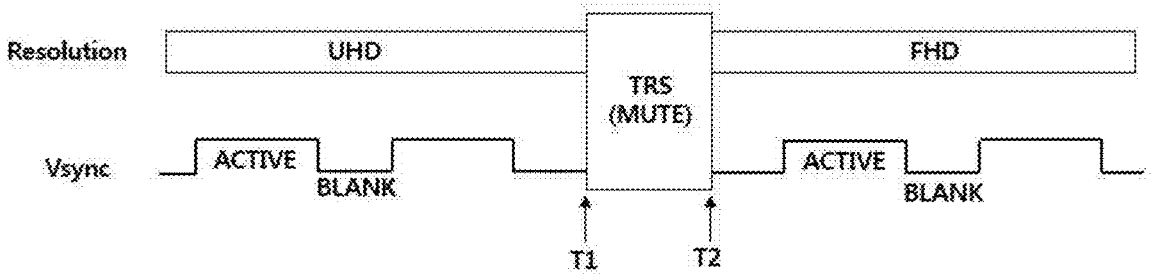

FIGS. 6 to 10 are diagrams for describing a display apparatus according to an aspect of the present disclosure, and FIGS. 11 and 12 are diagrams for describing a portion associated with a resolution change period occurring in changing a mode.

Figure 6:
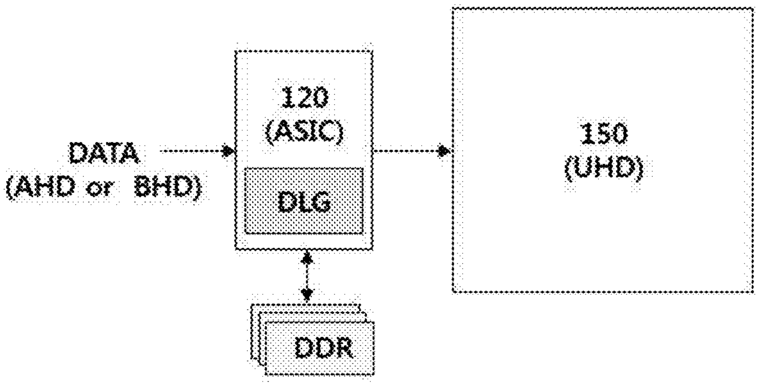
FIGS. 6 to 10 are diagrams for describing a display apparatus according to an aspect of the present disclosure.

As illustrated in FIG. 6, the display apparatus according to an aspect of the present disclosure may include a mode change unit DLG for changing a driving condition of the display panel 150, based on a resolution of a data signal DATA input from the outside.

The mode change unit DLG may include a timing controller 120 (ASIC) for controlling the display panel 150 and a memory DDR. For example, the mode change unit DLG may change a generating condition of a mode change signal, based on whether a resolution of the data signal DATA input from the outside is a first resolution AHD or a second resolution BHD.

Hereinafter, for convenience of description, an example is described where the first resolution AHD is ultra-high definition (UHD) (3840*2160) or a second resolution BHD is full high definition (FHD) (1920*1080). Also, an example where the mode change unit DLG is included in the timing controller 120 is described.

However, the mode change unit DLG may also be included in the video supply unit. In this case, the mode change unit DLG may be included in the timing controller 120 but may be configured so that a mode change signal applied from the outside is intactly output (transferred) to the inside or the outside.

Figure 7:
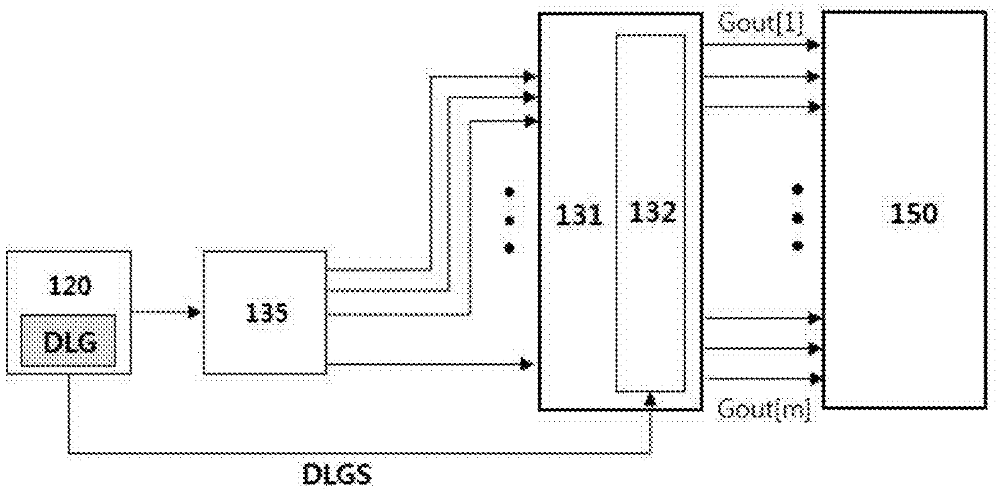

As illustrated in FIG. 7, the mode change unit DLG may supply the mode change signal through a signal line DLGS connected with an output change circuit unit 132. An example where the output change circuit unit 132 is included in the shift register 131 is illustrated, but the output change circuit unit 132 may also be included in the level shifter 135.

Figure 8:
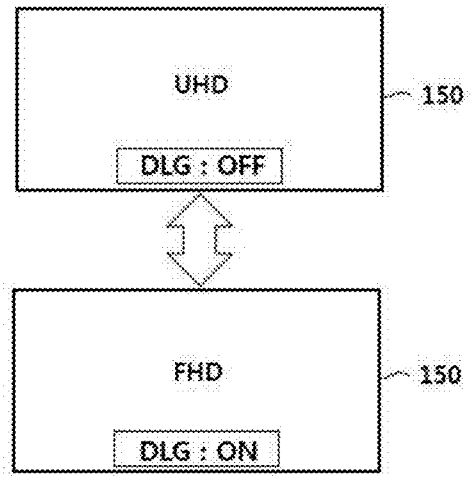

As illustrated in FIGS. 7, 8, and 9, when a resolution of a data signal DATA input from the outside corresponds to UHD, the mode change unit DLG may output a first mode change signal DLG: OFF. The mode change unit DLG may sequentially divide and output gate signals Gout[1] to Gout[8] which are to be supplied to the display panel 150, and in this case, one gate signal may be output per one gate line.

Furthermore, in FIG. 9, for example, a previously output gate signal and a subsequently output gate signal may partially overlap with each other so that a first gate signal Gout[1] is output through a first gate line and then a second gate signal Gout[2] is output through a second gate line to overlap with a partial period of the first gate signal Gout[1], but aspects of the present disclosure are not limited thereto.

As illustrated in FIGS. 7, 8, and 10, when a resolution of a data signal DATA input from the outside corresponds to FHD, the mode change unit DLG may output a second mode change signal DLG: ON. In this case, the shift register 131 may sequentially divide and output gate signals Gout[1] to Gout[8] which are to be supplied to the display panel 150, and in this case, one gate signal may be output per two gate lines. Therefore, two gate lines vertically adjacent to each other may transfer one gate signal which is identically generated.

As described above, when output types of gate signals are changed based on a change in resolution, a UHD display panel 150 illustrated in FIG. 6 may easily implement an image having a relatively low resolution like FHD image. Also, when gate signals Gout[1] to Gout[8] are output as in FIG. 10, an image having a relatively low resolution may be easily implemented like an FHD image, even without changing a driving frequency.

As illustrated in FIG. 11, when mode change occurs as a resolution is changed from UHD to FHD, a display apparatus according to an aspect of the present disclosure may have a resolution change period TRS.

The resolution change period TRS may be defined as a period for synchronizing (matching) a driving timing of the display panel when mode change occurs. Apparatuses may be synchronized with a changed driving condition in driving of the display apparatus during the resolution change period TRS, and thus, a phenomenon may be prevented where an apparatus operates in an abnormal state (for example, an abnormal screen output) in changing a resolution.

Gate signals may not be output during the resolution change period TRS. An operation where the gate signals are controlled not to be output may be expressed as a mute operation of a shift register. Additionally, a black image may be displayed for preventing an abnormal screen from being displayed on a display panel during the resolution change period TRS.

Furthermore, in FIG. 11, an example is illustrated where the resolution change period TRS occurs regardless of an active period ACTIVE or a blank period BLANK of a synchronization signal Vsync. However, as in FIG. 12, the resolution change period TRS may be synchronized with the synchronization signal Vsync. For example, the resolution change period TRS may start at a period T1 (a rising edge of the active period) at which the active period ACTIVE starts along with an end of the blank period BLANK, and the resolution change period TRS may end at a period T2 (a falling edge of the active period) at which the blank period BLANK starts along with an end of the active period ACTIVE.

Figure 13:
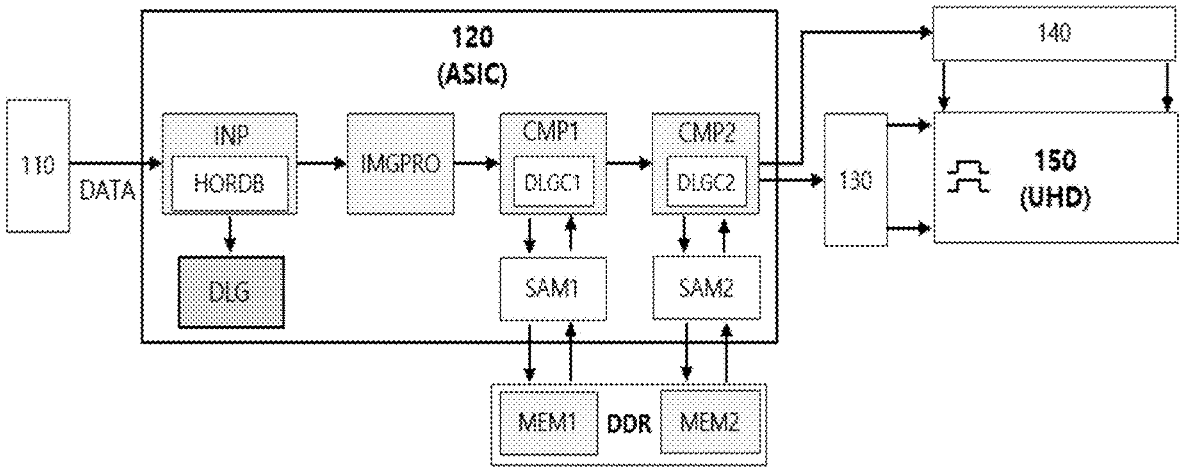
FIG. 13 is a diagram illustrating a main configuration of a display apparatus according to an aspect of the present disclosure.
Figure 14:
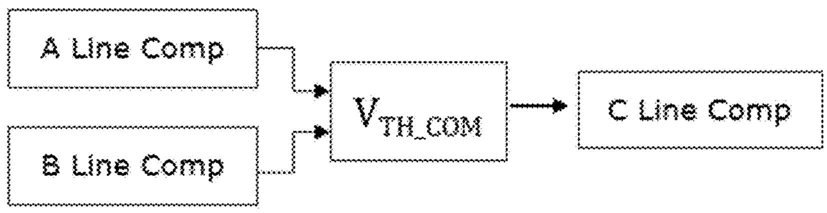
FIGS. 14 to 16 are diagrams for describing a multiline simultaneous compensation method according to an aspect of the present disclosure.
Figure 15:
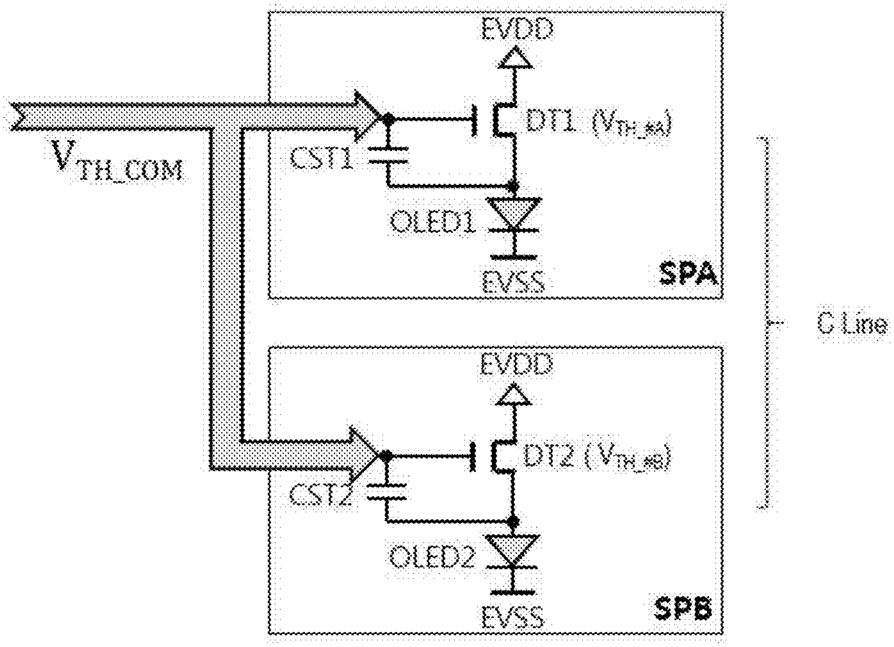
Figure 16:
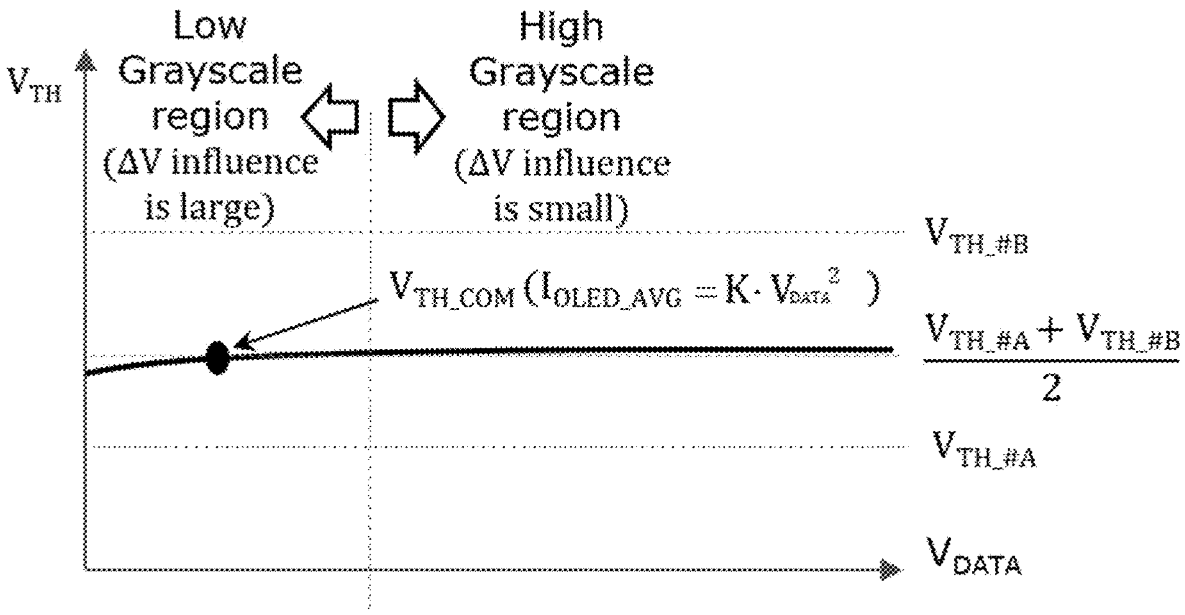
Figure 17:
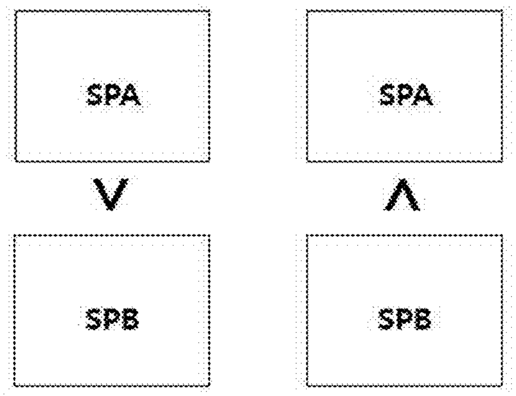
FIGS. 17 and 18 are diagrams for describing a difference between before and after an aspect of the present disclosure is applied.
Figure 18:
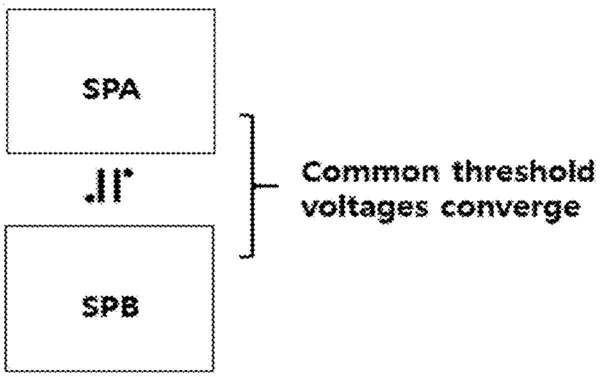

FIG. 13 is a diagram illustrating a main configuration of a display apparatus according to an aspect of the present disclosure, FIGS. 14 to 16 are diagrams for describing a multiline simultaneous compensation method according to an aspect of the present disclosure, and FIGS. 17 and 18 are diagrams for describing a difference between before and after an aspect of the present disclosure is applied.

As illustrated in FIG. 13, the display apparatus according to an aspect of the present disclosure may include a timing controller 120 which is implemented to change output types of gate signals and perform multiline simultaneous compensation, based on changing of a resolution.

The timing controller 120 may include an input processor INP, a mode change unit DLG, an image processor IMGPRO, a first compensation unit CMP1, a second compensation unit CMP2, a first sampling unit SAM1, and a second sampling unit SAM2.

The input processor INP may analyze a characteristic (a resolution, a frequency, etc.) of a data signal DATA input from the outside, and based thereon, may perform processing. To this end, the input processor INP may include a horizontal doubling unit HORDB which increases a resolution based on the characteristic of the data signal DATA.

When a resolution of the input data signal DATA is UHD, the input processor INP may intactly bypass the input data signal DATA to the image processor IMGPRO. Also, because a resolution of the input data signal DATA is UHD, the input processor INP may control the mode change unit DLG so that a first mode change signal is output.

On the other hand, when a resolution of the input data signal DATA is FHD, the input processor INP may increase a horizontal resolution (for example, 1920→3840) on the basis of the horizontal doubling unit HORDB, and then, may transfer the data signal DATA to the image processor IMGPRO. In this case, the data signal DATA output from the input processor INP may be changed from "1920*1080" to "3840*1080". Furthermore, because a resolution of the input data signal DATA is FHD, the input processor INP may control the mode change unit DLG so that a second mode change signal is output.

The image processor IMGPRO may perform image processing so that the data signal DATA transferred from the input processor INP is implemented in the display panel 150.

In a case where an image-processed data signal DATA is implemented in the display panel 150, the first compensation unit CMP1 may perform first signal compensation for reflecting a degradation characteristic of an organic light emitting diode included in the display panel 150. The first compensation unit CMP1 may sample a compensation value stored in a first storage space MEM1 of a memory DDR along with the first sampling unit SAM1 and may generate a first bit map to reflect a sampled compensation value in the data signal DATA. Also, in generating the first bit map, the first compensation unit CMP1 may reflect a changed resolution to generate a first common bit map. To this end, the first compensation unit CMP1 may include a first common compensation value calculation unit DLGC1, and this will be described below.

In a case where an image-processed data signal DATA is implemented in the display panel 150, the second compensation unit CMP2 may perform second signal compensation for reflecting a degradation characteristic of a driving transistor included in the display panel 150. The second compensation unit CMP2 may sample a compensation value stored in a second storage space MEM2 of the memory DDR along with the second sampling unit SAM2 and may generate a second bit map to reflect a sampled compensation value in the data signal DATA. Also, in generating the second bit map, the second compensation unit CMP2 may reflect a changed resolution to generate a second common bit map. To this end, the second compensation unit CMP2 may include a second common compensation value calculation unit DLGC2, and this will be described below.

When a resolution is changed, the display apparatus according to an aspect of the present disclosure may perform a multiline simultaneous compensation method which calculates a common compensation value to which a luminance average is applied, generates a common bit map on the basis of the calculated common compensation value, and compensates for a data signal, based on the generated common bit map. The reason that the multiline simultaneous compensation method is needed may be associated with compensating for a characteristic of an organic light emitting diode driven through fine current adjustment and a threshold voltage of a driving transistor generating a driving current.

Hereinafter, an example will be described where, when a resolution of the display apparatus is changed, the display apparatus calculates a common compensation value to which a luminance average is applied, based on the second compensation unit CMP2, a second common compensation value calculation unit DLGC2, the second sampling unit SAM2, and the second storage space MEM2, and based thereon, compensates a data signal.

As illustrated in FIGS. 14 to 16, each of a threshold voltage compensation value (A Line Comp) of a first driving transistor DT1 included in a subpixel SPA of an $A^{th}$ gate line and a threshold voltage compensation value (B Line Comp) of a second driving transistor DT2 included in a subpixel SPB of a $B^{th}$ gate line may be sampled.

Here, the subpixel SPA of the $A^{th}$ gate line and the subpixel SPB of the $B^{th}$ gate line may be vertically adjacent to each other and may correspond to subpixels to which the multiline simultaneous compensation method, performed based on the same gate signal and data voltage in changing a resolution, is applied. Hereinafter, in describing a relationship between a threshold voltage $V_{TH\_\#A}$ of the first driving transistor DT1 included in the subpixel SPA of the $A^{th}$ gate line and a threshold voltage $V_{TH\_\#B}$ of the second driving transistor DT2 included in the subpixel SPB of the $B^{th}$ gate line, a case where $V_{TH\_\#A}>V_{TH\_\#B}$ will be described as in FIG. 16.

As in FIG. 16, the threshold voltage $V_{TH\_\#A}$ of the first driving transistor DT1 included in the subpixel SPA of the $A^{th}$ gate line and the threshold voltage $V_{TH\_\#B}$ of the second driving transistor DT2 included in the subpixel SPB of the $B^{th}$ gate line may differ.

The threshold voltage compensation value (A Line Comp) of the first driving transistor DT1 and the threshold voltage compensation value (B Line Comp) of the second driving transistor DT2 may each be calculated as a common compensation value $V_{TH\_COM}$ to which a luminance average is applied, to minimize a compensation deviation caused by a difference therebetween.

Like $I_{OLED\_AVG}$=K. $V_{DATA}{}^2$, when the luminance average is equal to an ideal value, the common compensation value $V_{TH\_COM}$ for minimizing the compensation deviation may vary based on $V_{DATA}$. As seen in FIG. 16 and the following Equation 1, the common compensation value $V_{TH\_COM}$ may be defined as $\Delta V=V_{TH\_COM}-V_{TH}$. According to an equation relevant thereto, because ΔV may affect a luminance deviation by the square, a low grayscale region where an influence of ΔV is large may be applied, instead of a high grayscale region where an influence of ΔV is small. The reason may be because the high grayscale region is insensitive to a voltage deviation compared to the low grayscale region, but the low grayscale region is insensitive to the voltage deviation compared to the high grayscale region.

[Equation 1]

$$I_{OLED\_AVG} = K\cdot(V_{DATA})^2\left\{\begin{array}{l} I_{OLED\_\#A} = K\cdot(V_{DATA}+\Delta V_{-\#A})^2, \\ I_{OLED\_\#B} = K\cdot(V_{DATA}+\Delta V_{-\#B})^2 \end{array}\right\}$$

Furthermore, an example is illustrated where the common compensation value $V_{TH\_COM}$ is calculated by using $$\frac{V_{TH\_\#A}+V_{TH\_\#B}}{2}$$

on the threshold voltage $V_{TH\_\#A}$ of the first driving transistor DT1 included in the subpixel SPA of the $A^{th}$ gate line and the threshold voltage $V_{TH\_\#B}$ of the second driving transistor DT2 included in the subpixel SPB of the $B^{th}$ gate line and the high grayscale region, where an influence of ΔV is small, is applied. However, in the common compensation value $V_{TH\_COM}$, it should be understood that an optimal point is calculated through an experiment.

The common compensation value $V_{TH\_COM}$ calculated through the above-described aspects may be used as a compensation value (C Line Comp) of common subpixels. Here, the compensation value (C Line Comp) of the common subpixels may correspond to subpixels which operate based on the same gate signal and data voltage in changing a resolution, as in the subpixel SPA of the $A^{th}$ gate line and the subpixel SPB of the $B^{th}$ gate line. Furthermore, in FIGS. 14 and 15, C Line may be for showing that the subpixel SPA of the $A^{th}$ gate line and the subpixel SPB of the $B^{th}$ gate line are grouped into common subpixels to apply the multiline simultaneous compensation method.

In a case where the common subpixels are compensated for by using the method according to the aspects, a possibility, that a luminance deviation occurs when the threshold voltage $V_{TH\_\#A}$ of the first driving transistor DT1 differs from the threshold voltage $V_{TH\_\#B}$ of the second driving transistor DT2 (shown in FIG. 16, e.g., $V_{TH\_\#A}<V_{TH\_\#B}$), may be minimized. Also, in a case where the common subpixels are compensated for by using the method according to the aspects, a possibility of recognition of a luminance deviation may be minimized compared to a method which the same compensation value is simply applied to the subpixel SPA of the $A^{th}$ gate line and the subpixel SPB of the $B^{th}$ gate line. Also, two subpixels vertically adjacent to each other may be compensated for within one horizontal period, without a memory addition access process (DDR Access Process) or an increase in a memory band width (DDR Bandwidth) needed in preparing a compensation value.

Therefore, in a case where the common subpixels are simply compensated for based on the same compensation value, as in FIG. 17, the common threshold voltages of the subpixel SPA of the $A^{th}$ gate line and the subpixel SPB of the $B^{th}$ gate line may not converge, and thus, there may be a possibility that a luminance deviation occurs. However, in a case where the common subpixels are compensated for based on the method according to the aspects, as in FIG. 18, the common threshold voltages of the subpixel SPA of the $A^{th}$ gate line and the subpixel SPB of the $B^{th}$ gate line may converge, and thus, a possibility that a luminance deviation occurs may be minimized.

Figure 19:
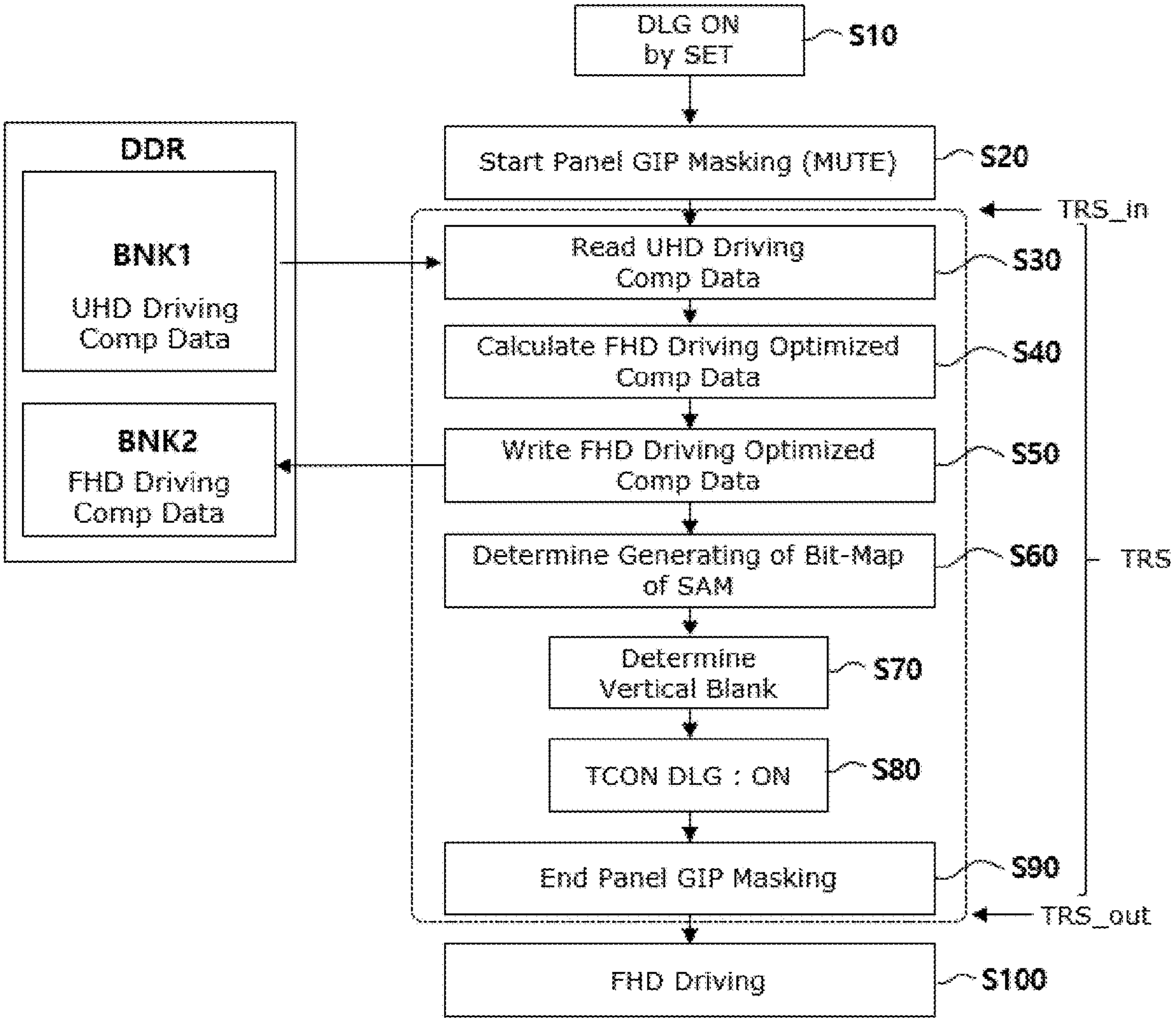
FIG. 19 is a flowchart illustrating a portion associated with the multiline simultaneous compensation of a display apparatus according to an aspect of the present disclosure.
Figure 20:
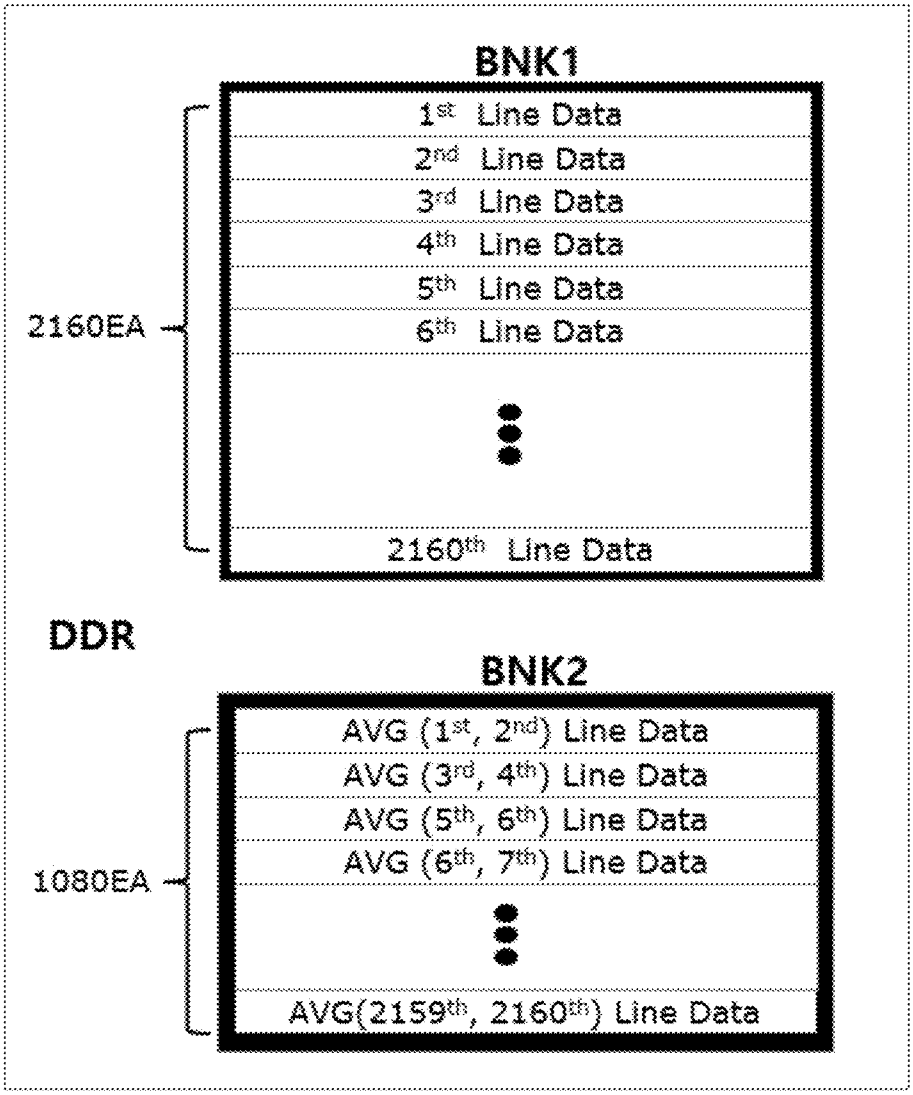
FIG. 20 is an exemplary diagram of memory allocation for storing a compensation value.

FIG. 19 is a flowchart illustrating a portion associated with the multiline simultaneous compensation of a display apparatus according to an aspect of the present disclosure, and FIG. 20 is an exemplary diagram of memory allocation for storing a compensation value.

As illustrated in FIG. 19, when FHD instead of UHD is applied to a video supply unit (a set), the video supply unit (the set) may output a mode change signal DLG: ON. When the mode change signal DLG: ON is supplied from the video supply unit (DLG ON by SET) (S10), a timing controller may operate so that masking (Panel GIP Masking) or mute (MUTE) of a shift register starts not to output a gate signal to a display panel (S20).

When the masking (Panel GIP Masking) or mute (MUTE) of the shift register starts, a display apparatus may enter a resolution change period (TRS_in), and then (after enter), may perform an operation needed for resolution change. During the resolution change period TRS, the timing controller may perform a read operation to read a UHD driving compensation value (Comp Data) from a first bank BNK1 of a memory DDR (S30).

During the resolution change period TRS, the timing controller may calculate an FHD driving optimized compensation value (Optimized Comp Data), based on the UHD driving compensation value (Comp Data) (S40). A method of calculating the FHD driving optimized compensation value (Optimized Comp Data) on the basis of the UHD driving compensation value (Comp Data) may be as illustrated in FIGS. 13 to 16. That is, the FHD driving optimized compensation value (Optimized Comp Data) may correspond to a common compensation value.

During the resolution change period TRS, the timing controller may perform a write operation for storing the FHD driving optimized compensation value (Optimized Comp Data) in a second bank BNK2 of the memory DDR (S50). As in FIG. 20, it may be seen that the first bank BNK1 stores a compensation value for one gate line each, based on UHD, and second bank BNK2 stores a common compensation value of two gate lines each, based on FHD (for example, AVG ($1^{st}$, $2^{nd}$) Line Data). Accordingly, the first bank BNK1 may store a compensation value of total 2160EA, based on UHD, and the second bank BNK2 may store a compensation value of total 1080EA, based on FHD.

During the resolution change period TRS, the timing controller may determine whether a common bitmap is normally generated based on the FHD driving optimized compensation value by using a sampling unit (S60). When generating of the common bitmap is completed, the timing controller may determine whether a vertical blank included in a vertical synchronization signal occurs, to end the resolution change period TRS (S70). When the vertical blank occurs, the timing controller may output a mode change signal (TCON DLG: ON) (S80) and may operate to end the masking (Panel GIP Masking) of the shift register (S90).

When the masking (Panel GIP Masking) of the shift register ends, the display apparatus may deviate from the resolution change period (TRS_out), and then (after deviation), may be driven based on FHD which is a changed resolution (S100). In a case where the display apparatus is driven based on FHD, the timing controller may prepare a compensation data signal which is to be applied to two gate lines in common, based on the common compensation value (for example, AVG ($1^{st}$, $2^{nd}$) Line Data) stored per two gate lines on the basis of FHD instead of the compensation value (for example: $1^{st}$ Line Data) stored per one gate line on the basis of UHD.

In a case which prepares a compensation data signal which is to be applied to two gate lines in common, based on a flow described above, a re-driving operation of turning off a display apparatus and then turning on the display apparatus may be omitted for driving the display apparatus on the basis of a changed resolution. That is, in a case where a resolution is changed in an operation of displaying an image on a display panel, driving conditions of apparatuses needed for driving of the display panel without a re-driving operation, and then, an image may be displayed based on the compensation data signal. Also, in a case which prepares the compensation data signal which is to be applied to two gate lines in common, based on the flow described above, a degradation in image quality may be minimized in driving the display apparatus on the basis of a changed resolution.

Hereinafter, a compensation method for minimizing a degradation in image quality will be further described.

Figure 21:
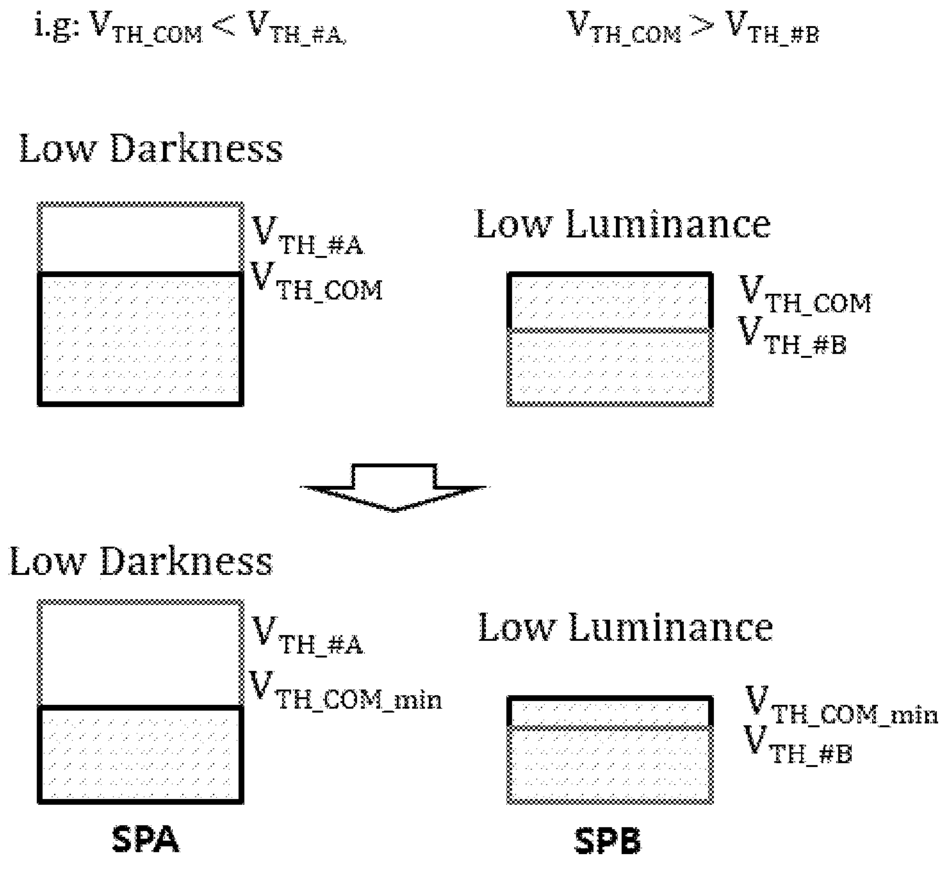
FIG. 21 is a diagram for describing a low grayscale luminance and darkness compensation method according to an aspect of the present disclosure.

FIG. 21 is a diagram for describing a low grayscale luminance and darkness compensation method according to an aspect of the present disclosure.

As illustrated in FIG. 21, the present disclosure may compensate for low luminance and low darkness which may occur when ΔV is large, based on a method of additionally reflecting an offset value (min_offset) in a common compensation value. Here, the offset value (min_offset) may be a value corresponding to ΔVmin having a condition capable of minimizing low luminance in a low gray level, and moreover, may be calculated through an experiment.

For example, when a threshold voltage $V_{TH\_\#A}$ of a first driving transistor included in a subpixel SPA of an $A^{th}$ gate line is higher than a common compensation value $V_{TH\_COM}$, low darkness may occur in the subpixel SPA of the $A^{th}$ gate line. On the other hand, when the common compensation value $V_{TH\_COM}$ is higher than a threshold voltage $V_{TH\_\#B}$ of a second driving transistor included in a subpixel SPB of a $B^{th}$ gate line, low luminance may occur in the subpixel SPB of the $B^{th}$ gate line. At this time, when the offset value (min_offset) corresponding to ΔVmin is additionally reflected in the common compensation value $V_{TH\_COM}$, low luminance and low darkness occurring in the subpixel SPA of the $A^{th}$ gate line and the subpixel SPB of the $B^{th}$ gate line may be compensated for (improved).

Figure 22:
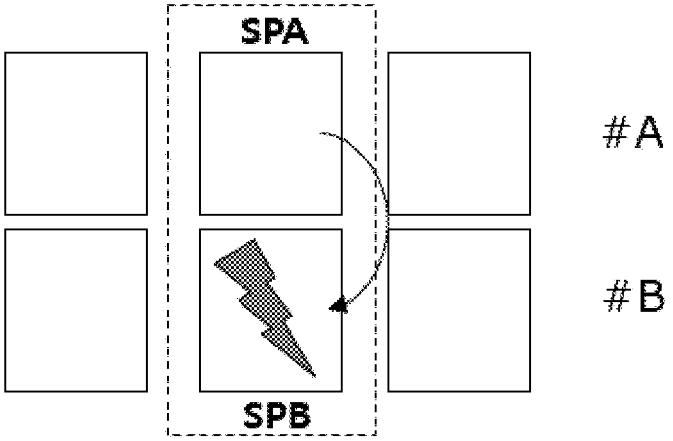
FIGS. 22 and 23 are diagrams for describing a defect compensation method according to an aspect of the present disclosure.
Figure 23:
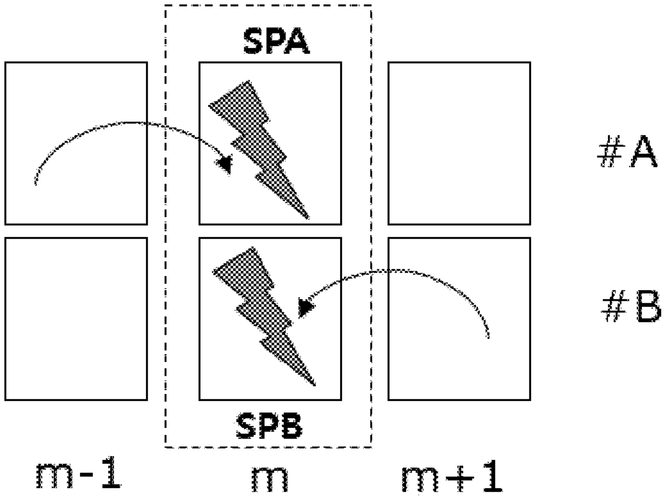

FIGS. 22 and 23 are diagrams for describing a defect compensation method according to an aspect of the present disclosure.

As illustrated in FIGS. 22 and 23, the present disclosure may compensate for a subpixel having a defect, based on a method which applies (replaces) a common compensation value of subpixels vertically or horizontally adjacent to each other when a sensing error of a driving transistor occurs. Here, the defect may denote a defect where the uniformity of an element (for example: OLED uniformity) included in a subpixel is reduced like the short circuit of an organic light emitting diode (OLED).

For example, as in FIG. 22, when a defect is in a subpixel SPB of a $B^{th}$ gate line #B, a common compensation value of a subpixel SPA of an $A^{th}$ gate line #A disposed adjacent to an upper portion thereof may be applied to the subpixel SPB of the $B^{th}$ gate line #B ($V_{TH\_COM}=V_{TH\_A}$).

For example, as in FIG. 23, when a defect is in the subpixel SPA of the $A^{th}$ gate line #A and the subpixel SPB of the $B^{th}$ gate line #B, a common compensation value of an m−$1^{st}$ subpixel SPA disposed adjacent to a left portion and a common compensation value of an m+$1^{st}$ subpixel SPB disposed adjacent to a right portion may be applied to the subpixel SPA of the $A^{th}$ gate line #A and the subpixel SPB of the $B^{th}$ gate line #B ($V_{TH\_COM}=V_{TH\_COM\_}m-1+V_{TH\_COM\_m+1}/2$).

Hereinabove, the present disclosure may drive a display panel on the basis of an optimized compensation value without an increase in bandwidth caused by an additional access of a memory in changing a resolution, thereby minimizing a degradation in image quality. Also, the present disclosure may simultaneously drive at least two gate lines in changing a resolution and may maintain uniform display quality by using a multiline simultaneous compensation method capable of compensating for a data signal in common, based on an optimal common compensation value to which a luminance average is applied.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims.

It will be apparent to those skilled in the art that various modifications and variations can be made in the display apparatus and the driving method thereof of the present disclosure without departing from the spirit or scope of the aspects. Thus, it is intended that the present disclosure covers the modifications and variations of the aspects provided they come within the scope of the appended claims and their equivalents.

What is claimed is:

1. A display apparatus comprising:

a display panel configured to display an image;

a gate driver configured to supply gate signals to the display panel;

a timing controller configured to control the gate driver; and a memory controlled by the timing controller, wherein the timing controller performs masking so that the gate signals are not output when a resolution of the image to be input is changed to a second resolution which is lower than a first resolution, and calculates a driving compensation value to display the image with the second resolution during a resolution change period, and wherein the timing controller reads a first resolution driving compensation value to display the image with the first resolution from a first bank of the memory during the resolution change period and calculates a second resolution driving compensation value to display the image with the second resolution based on the first resolution driving compensation value.

2. The display apparatus of claim 1, wherein the memory includes a second bank storing the second resolution driving compensation value that is calculated during the resolution change period.

3. The display apparatus of claim 2, wherein the second resolution driving compensation value comprises a common compensation value for commonly compensating for subpixels connected with at least two gate lines.

4. The display apparatus of claim 3, wherein the common compensation value is calculated based on a luminance average of the subpixels connected with the at least two gate lines.

5. The display apparatus of claim 4, wherein the common compensation value comprises a value for commonly compensating for a threshold voltage of a driving transistor, included in each of a first subpixel connected with a first gate line and a second subpixel connected with a second gate line disposed next to the first gate line.

6. The display apparatus of claim 1, wherein the resolution change period is ended when generating of a bitmap for compensating for an image based on the second resolution driving compensation value is completed.

7. The display apparatus of claim 6, wherein the generating of the bitmap is completed when a vertical blank included in a vertical synchronization signal occurs.

8. A driving method of a display apparatus, the driving method comprising:

when a resolution of an input image is changed to a second resolution which is lower than a first resolution, reading a first resolution driving compensation value, needed in displaying an image with the first resolution, from a first bank of a memory during a resolution change period; and calculating a second resolution driving compensation value, needed in displaying an image with the second resolution, based on the first resolution driving compensation value, for calculating a driving compensation value needed in displaying an image with the second resolution; and wherein the second resolution driving compensation value comprises a common compensation value for commonly compensating for subpixels connected with at least two gate lines.

9. The driving method of claim 8, wherein the common compensation value comprises a value for commonly compensating for a threshold voltage of a driving transistor, included in each of a first subpixel connected with a first gate line and a second subpixel connected with a second gate line disposed next to the first gate line.

10. The driving method of claim 8, wherein the common compensation value is calculated based on a luminance average of the subpixels connected with the at least two gate lines.

11. The driving method of claim 10, wherein the common compensation value comprises a value for commonly compensating for a threshold voltage of a driving transistor, included in each of a first subpixel connected with a first gate line and a second subpixel connected with a second gate line disposed next to the first gate line.

12. A display apparatus comprising:

a display panel configured to display an image with one of a first resolution and a second resolution lower than the first resolution;

a gate driver configured to supply a plurality of gate signals to the display panel;

a memory including a first bank and second bank, the first bank storing a first resolution driving compensation value for compensating for the image to be displayed with the first resolution; and a timing controller configured to control the gate driver to output the plurality of gate signals to display the image with the first resolution and not to output the plurality of gate signals to display the image with the second resolution, and calculate a second resolution driving compensation value for compensating for the image to display with the second resolution based on the first resolution driving compensation value during a resolution change period, and wherein the second resolution driving compensation value includes a common compensation value for commonly compensating for subpixels connected with at least two gate lines.

13. The display apparatus of claim 12, wherein the second bank of the memory stores the second resolution driving compensation value.

14. The display apparatus of claim 12, wherein the common compensation value is calculated based on a luminance average of the subpixels connected with the at least two gate lines.

15. The display apparatus of claim 14, wherein the common compensation value comprises a value for commonly compensating for a threshold voltage of a driving transistor included in each of a first subpixel connected with a first gate line and a second subpixel connected with a second gate line disposed next to the first gate line.

16. The display apparatus of claim 12, wherein the resolution change period is ended when generation of a bitmap for compensating for the image displaying with the second resolution driving compensation value is completed.

17. The display apparatus of claim 12, wherein the generation of a bitmap is completed when a vertical blank included in a vertical synchronization signal of the plurality of gate signals occurs.

* * * * *